US007715969B2

(12) United States Patent
Yamamura

(10) Patent No.: US 7,715,969 B2
(45) Date of Patent: May 11, 2010

(54) ASSISTING A VEHICLE DRIVER VIA CHANGES IN REACTION FORCE AND ENGINE OUTPUT CHARACTERISTIC

(75) Inventor: Tomohiro Yamamura, Yokohama (JP)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 664 days.

(21) Appl. No.: 11/067,927

(22) Filed: Mar. 1, 2005

(65) Prior Publication Data

US 2005/0222742 A1   Oct. 6, 2005

(30) Foreign Application Priority Data

Mar. 11, 2004   (JP) ................ P2004-069514

(51) Int. Cl.
*G06F 7/70* (2006.01)
*G06G 7/00* (2006.01)

(52) U.S. Cl. ............... 701/70; 701/1; 701/54; 701/65; 701/79; 701/84

(58) Field of Classification Search ........... 701/70, 701/68, 60, 53, 54, 58, 65, 55, 56, 93, 1, 701/27, 28, 33, 36, 48, 71, 72, 75–77, 78, 701/79, 84, 85, 86, 96–98, 45; 180/232, 180/271, 277, 279, 284
See application file for complete search history.

(56) References Cited

U.S. PATENT DOCUMENTS

| | | | | |
|---|---|---|---|---|
| 4,819,163 | A | * | 4/1989 | Shimizu et al. ............. 701/101 |
| 5,188,001 | A | * | 2/1993 | Sukeshita et al. ............. 74/560 |
| 6,087,942 | A | * | 7/2000 | Sleichter et al. ............. 340/576 |
| 6,161,071 | A | * | 12/2000 | Shuman et al. ............... 701/48 |
| 6,259,992 | B1 | | 7/2001 | Urai et al. |
| 6,945,346 | B2 | * | 9/2005 | Massen ...................... 180/170 |
| 2003/0060936 | A1 | | 3/2003 | Yamamura et al. |
| 2003/0233187 | A1 | * | 12/2003 | Egami ......................... 701/96 |
| 2003/0236602 | A1 | * | 12/2003 | Kuge et al. ................... 701/36 |
| 2006/0195245 | A1 | | 8/2006 | Kobayashi |

FOREIGN PATENT DOCUMENTS

EP   1 375 232 A1   1/2004

(Continued)

OTHER PUBLICATIONS

Japanese Office Action issued in corresponding Japanese Patent Application No. JP 2004-069514, dated Sep. 12, 2006.

*Primary Examiner*—Khoi Tran
*Assistant Examiner*—Bhavesh V Amin
(74) *Attorney, Agent, or Firm*—McDermott Will & Emery LLP

(57) ABSTRACT

A scene recognition device detects the state of the environment around a vehicle. Risk is determined based on the detected state of the environment. Based on the detected state of the environment and/or the determined risk, an actuator coupled to an accelerator selects one out of different reaction force characteristics of varying of reaction force with different positions of the accelerator. Based on the detected state of the environment and/or the determined risk, an engine output modifier modifies an engine output characteristic of varying of engine output with different positions of the accelerator.

12 Claims, 6 Drawing Sheets

FOREIGN PATENT DOCUMENTS

| | | |
|---|---|---|
| EP | 1 375 234 A2 | 1/2004 |
| EP | 1 375 280 A2 | 1/2004 |
| JP | 57-33048 | 2/1982 |
| JP | 57-167845 | 10/1982 |
| JP | 3-943 | 1/1991 |
| JP | 10-166889 | 6/1998 |
| JP | 10-166890 | 6/1998 |
| JP | 2000-52809 | 2/2000 |
| JP | 2003-063430 A | 3/2003 |

* cited by examiner

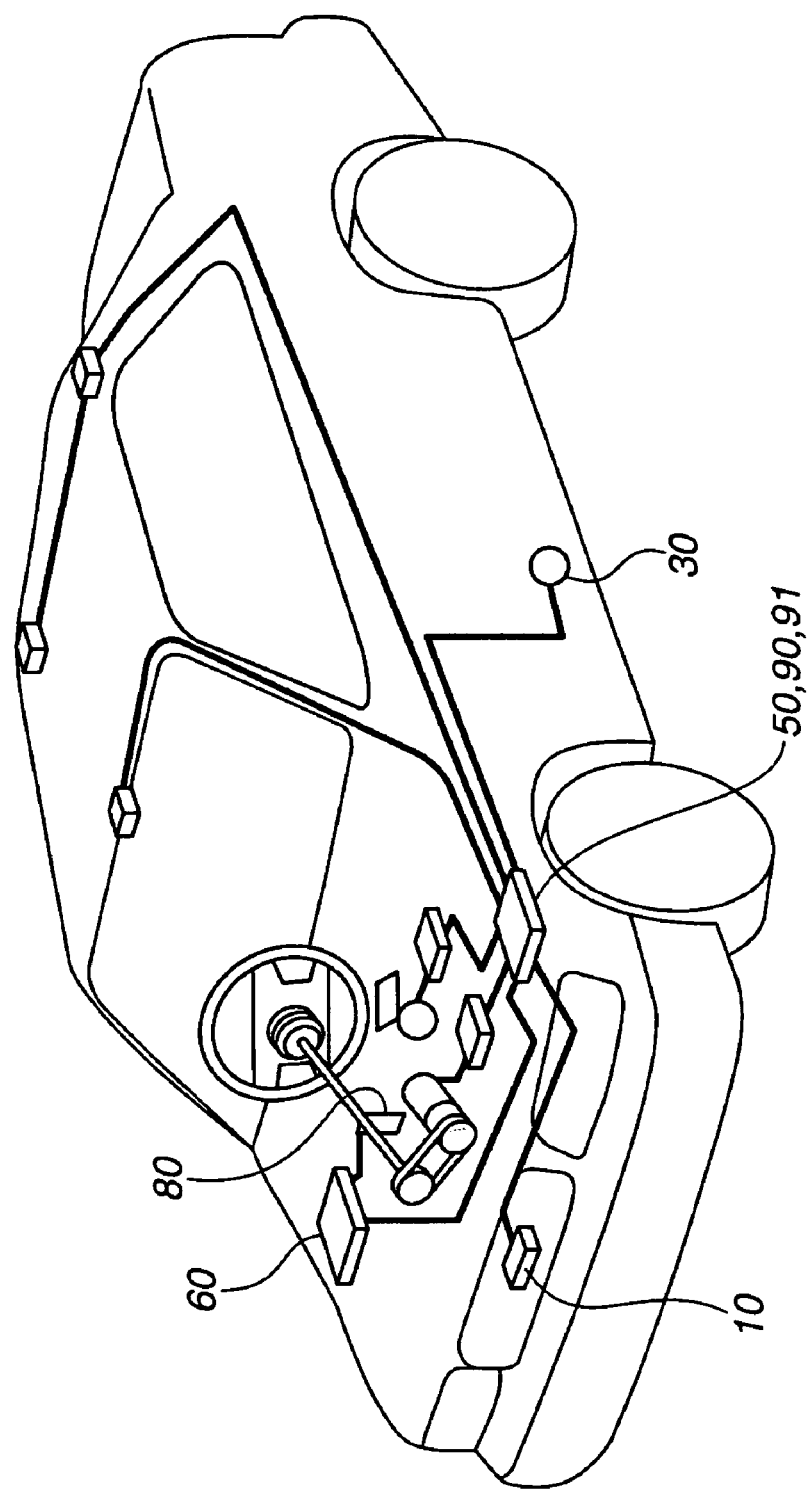

ASSISTING A VEHICLE DRIVER VIA CHANGES IN REACTION FORCE AND ENGINE OUTPUT CHARACTERISTIC

RELATED APPLICATION

The present application claims the benefit of priority from Japanese Patent Application No. 2004-69514, filed Mar. 11, 2004, which application is hereby incorporated by reference in its entirety.

BACKGROUND OF THE INVENTION

1. Field of the Invention

The present invention relates to a system and method for assisting a driver of a vehicle traveling on a road.

2. Description of Related Art

The conventional art describes various methods and systems for assisting a driver of a vehicle.

One example of such a system is described in U.S. 2003/0060936 A1, published Mar. 27, 2003. This system comprises a data acquisition system acquiring data including information on status of a vehicle and information on environment in a field around the vehicle, a controller, and at least one actuator. The controller determines a future environment in the field around the vehicle using the acquired data, for making an operator response plan in response to the determined future environment, which plan prompts the operator to operate the vehicle in a desired manner for the determined future environment. The actuator is coupled to a driver controlled input device to mechanically affect operation of the input device in a manner that prompts, via a haptic input from the driver controlled input device, the driver to operate the vehicle in the desired manner.

Another example of such a system is described in JP2003-063430. This system transmits the relationship between a vehicle and an obstacle in front of the vehicle to a driver of the vehicle via a continuous change in reaction force from an accelerator pedal. In this system, the reaction force varies continuously with different stages of the relationship.

Still another example of such a system is described in JP10-166889. This system alerts a driver by regulating reaction force from an accelerator pedal when a distance to an obstacle becomes shorter than a predetermined value.

These systems are satisfactory to some extent. However, a need remains for a less complicated and less expensive system.

An object of the present invention is to provide a less complicated and less expensive system and method for assisting a driver operating a vehicle traveling on a road.

SUMMARY OF THE INVENTION

According to one aspect of the present invention, a system is provided for assisting a driver operating a vehicle traveling on a road. The system comprises an engine controller regulating operation of an engine of the vehicle to provide a desired engine output characteristic. Control logic is provided that controls the engine controller to modify the engine output characteristic in response to at least one of a detected state of an environment around the vehicle and a determined risk. An accelerator is also provided, having different positions and selectively producing different acceleration reaction force characteristics. Each different acceleration reaction force characteristic provides varying of reaction force with different positions of the accelerator.

In one embodiment, an exemplary system includes an accelerator having different positions. As discussed earlier, characteristics of (1) an engine output and (2) a reaction force applied to the accelerator pedal, which vary with positions of an accelerator pedal, are modified according to a determined risk associated with a vehicle, such that the driver can sense a change in the character of the reaction force and/or engine output when the risk changes. The engine operation switches between a first operation mode and a second operation mode according to the determined risk. Under the first operation mode, the engine output varies with positions of the accelerator, according to a predefined normal engine output characteristic, and under the second operation mode, the engine output varies with positions of the accelerator, according to a modified engine output characteristic selected from multiple predefined modified engine output characteristics according to the determined risk. Each of the modified engine output characteristics defines a range of accelerator positions, and the engine output corresponding to a position within the range is lower than the engine output corresponding to the same position according to the normal engine output characteristic. When the determined risk is lower than a preset threshold, the control logic controls the vehicle to operate under the first operation mode, and when the determined risk is higher than the preset threshold, the control logic controls the vehicle to operate under the second operation mode.

BRIEF DESCRIPTION OF THE DRAWINGS

FIG. 2 is a perspective view of a motor vehicle equipped with the system of FIG. 1.

DETAILED DESCRIPTION OF THE INVENTION

Figure 1:
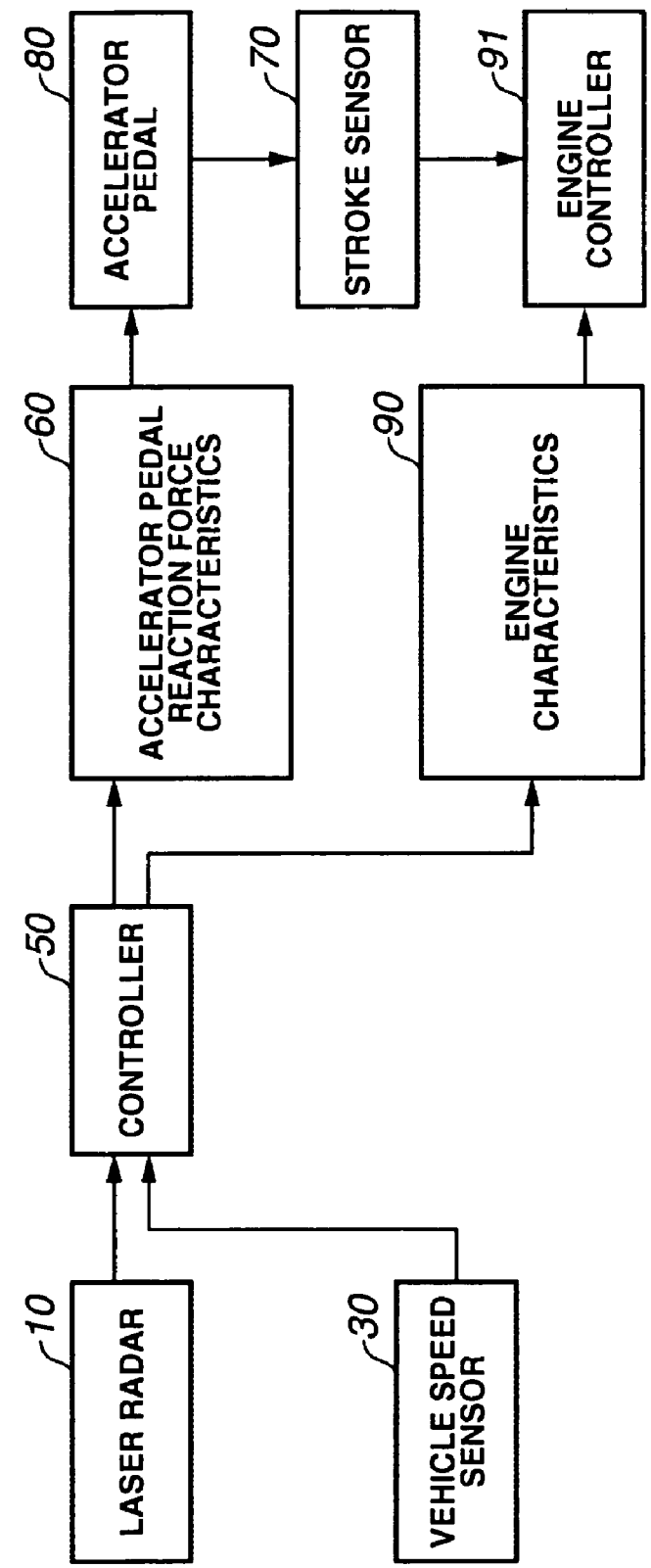
FIG. 1 is a block diagram of one embodiment of a system according to the present invention.

With reference to FIG. 1, the reference numeral 1 generally denotes one embodiment of a system for assisting a driver operating a motor vehicle (see FIG. 2) by manipulating an accelerator or gas pedal 80. The system 1 includes a scene recognition device detecting the state of the environment around the vehicle.

In the embodiment, the scene recognition device includes a radar device 10. The radar device 10 is positioned at a center of a front grill or a front bumper of the vehicle for transmitting pulsed beam or radar waves ahead of the vehicle in order to detect obstacles within the field of view of the radar. Although it may be a conventional millimeter wave, frequently modulated continuous (FMCW) radar, the radar device 10, in this embodiment, is an infrared laser radar. An infrared pulsed beam travels, as a transmitted beam, toward a measurement zone. A light receiving device receives the transmitted beam returning from an obstacle inside the measurement zone. Due to the use of a rotating polygonal mirror, two-dimensional scanning in the forward direction is possible, so that the pulsed beam can be swiveled horizontally due to the rotation of the polygonal mirror, and the pulsed beam can be swiveled vertically due to a plurality of mirror surfaces of the polygonal mirror inclined at different angles. In the embodiment, the pulsed beam can be swiveled horizontally and laterally about 6 degrees to each side of a longitudinal line passing through the center of the vehicle 1.

Based on the time delay and phase difference between the transmitted beam from the laser radar 10 and the received reflected beam, a distance and azimuth angle between each of the detected obstacle(s) and the vehicle can be determined.

The scene recognition device also includes a vehicle speed sensor 30. The vehicle speed sensor 30 detects a speed of the vehicle by measuring a speed of each of the road wheels or a speed of an output shaft of a transmission.

Based on the detected state of the environment around the vehicle, a first control logic or controller 50 determines risk RP. The control logic 50 processes outputs from the radar device 10 and vehicle speed sensor 30 to determine a vehicle speed v1 of the motor vehicle illustrated in FIG. 2, a vehicle speed v2 of the preceding vehicle in front, a distance d to the preceding vehicle, and a relative vehicle speed vr (vr=v2−v1). The control logic 50 proceeds to determine a time to collision TTC, which may be expressed as:

$$TTC = -d/vr \quad \text{(Equation 1)}$$

The control logic 50 proceeds to determine a time headway THW, which may be expressed as:

$$THW = d/v1 \quad \text{(Equation 2)}$$

The control logic 50 proceeds to determine risk RP, which may be expressed as:

$$RP = a/THW + b/TTC \quad \text{(Equation 3)}$$

where: a and b are weighting values, respectively, and, for example, a=1 and b=8 (a<b).

For understanding the notions expressed by equations 1, 2 and 3, reference should be made to U.S. 2003/0060936 A1, which has been herein incorporated by reference in its entirety.

The control logic 50 proceeds to determine whether or not the determined risk RP is greater than a predetermined value RP0. If this is the case, the control logic 50 determines that the risk RP should be transmitted to the driver.

In response to the detected state of the environment around the vehicle or the determined risk RP, control logic 60 generates a control signal fed to an accelerator pedal unit 80. The control logic 60 determines which one out of different accelerator pedal reaction force characteristics as shown, for example, in FIG. 5 or 7 or 8, the accelerator pedal unit 80 should select and produce. In the embodiment, the result of determination by the control logic 50 and position of the accelerator pedal 80 are used as the basis for the control logic 60 to make the determination. Once, the determination is made, the control logic 60 creates the control signal to be fed to the accelerator pedal unit 80.

The embodiment may well be understood from description of the accelerator pedal unit 80.

Figure 3A:
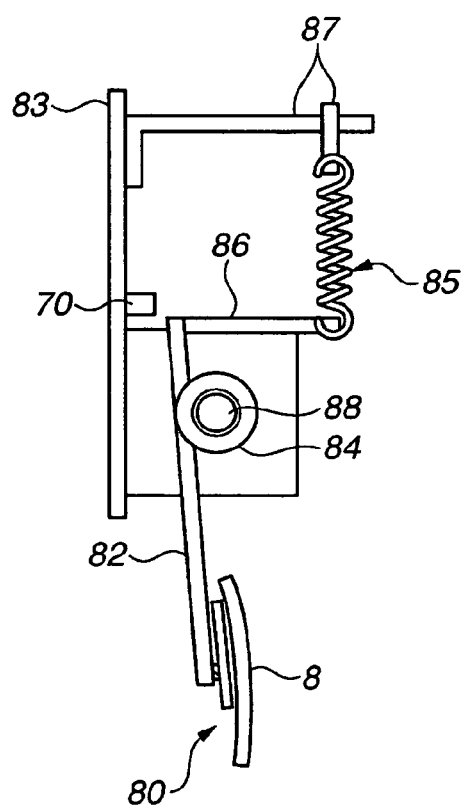
FIG. 3(a) is a left side view of an accelerator pedal.
Figure 3B:
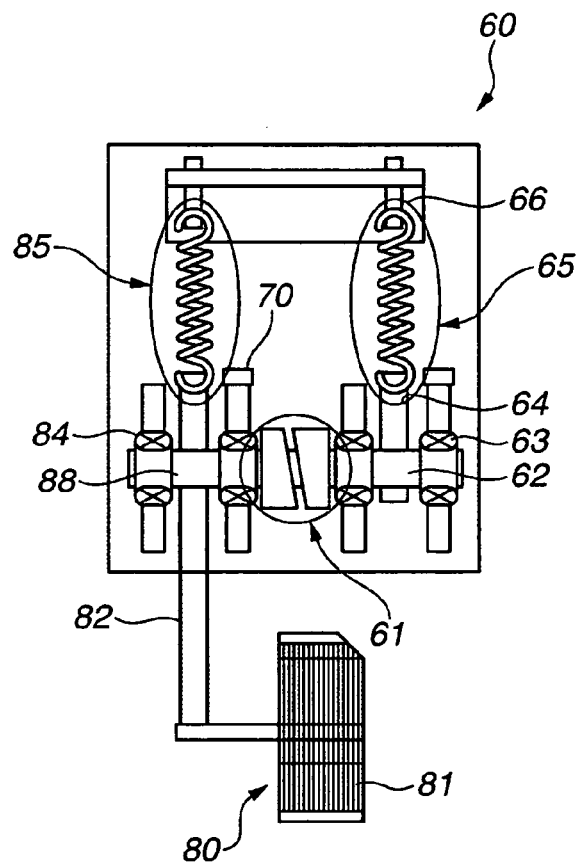
FIG. 3(b) is a front view of the accelerator pedal.

With reference to FIGS. 3(a) and 3(b), the accelerator pedal unit 80 has a pedal 81, which may take different positions upon receiving stress when the driver steps on the pedal 81. The pedal 81 is supported by a lever 82. At one end, the lever 82 is attached to the pedal 81. At a portion between the one end and the opposite end, the lever 82 is pivotally supported by a base plate 83 fixed to the vehicle body. Specifically, the base plate 83 has a first rotary shaft 88 supported by bearings 84, and the rotary shaft 88 is fixed to that portion of the lever 82 between the one and the opposite end. At the opposite end, the lever 82 has a bracket 86 anchoring one end of a first tensile spring 85. At its opposite end, the first tensile spring 85 is anchored to a bracket 87 that is fixed to the base plate 83. A stroke sensor 70 measures an amount of rotation of the rotary shaft 88. The stroke sensor 70 determines the position S of the accelerator pedal 81 based on the rotation amount measurement and generates a sensor signal indicative of the position S.

In addition to the first rotary shaft 88, the base plate has a second rotary shaft 62. The second rotary shaft 62 is supported by bearings 63. The second rotary shaft 62 is fixed to a bracket 64 at one end thereof. At the opposite end, the bracket 64 anchors one end of a second tensile spring 65. At the opposite end, the second tensile spring 65 is anchored to a bracket 66 that is fixed to the base plate 83.

As best seen in FIG. 3(b), the first and second rotary shafts 88 and 62 are aligned. An electromagnetically operated torque transmitting unit 61, in the form of, for example, an electromagnetically operated clutch, is provided to establish torque transmission between the first and second rotary shafts 88 and 62. In response to the control signal from the second control logic 60, electric current passing through the electromagnetically operated clutch 61 is regulated. When the electromagnetically operated clutch 61 is disengaged, the second rotary shaft 62 is disconnected. Under this condition, the first tensile spring 85 give reaction force to the driver via the pedal 81. When the electromagnetically operated clutch 61 is fully engaged, the second tensile spring 65 fully cooperates with the first tensile spring 85 to give increased reaction force to the driver via the pedal 81.

With reference again to FIG. 1, the determined risk RP at the control logic 50 is transmitted to a control logic 90. In response to the determined risk RP and the detected state of the environment, if desired, the control logic 90 selects one of data of different engine output characteristics, each in the form of a pattern of variation of correction amount with different positions S of the pedal 81, and determines a correction amount. The control logic 90 generates a correction signal indicative of the correction amount to modify an engine control signal fed to an engine controller 91. In response to the engine control signal, the engine controller 91 regulates operation of an engine of the vehicle to provide an engine output characteristic of varying of engine output with the different positions S of the accelerator pedal 81.

From the preceding description, it is appreciated that the control logic 90 modifies operation of the engine controller 91 to modify the engine output characteristic.

The control logic or controller 50 may contain a microprocessor including as usual a central processing unit (CPU), and computer readable storage medium, such as a read only memory (ROM), a random access memory (RAM). In the illustrated block diagram of FIG. 1, the control logic 60 and control logic 90 are illustrated as elements physically separated from the control logic 50. Each of the control logics 50, 60 and 90 may contain a microprocessor. However, if desired, as is so in the embodiment, the control logics 50, 60 and 90 may share a common microprocessor. In this case, the control logic 50, 60 and 90 are software implemented.

Figure 4:
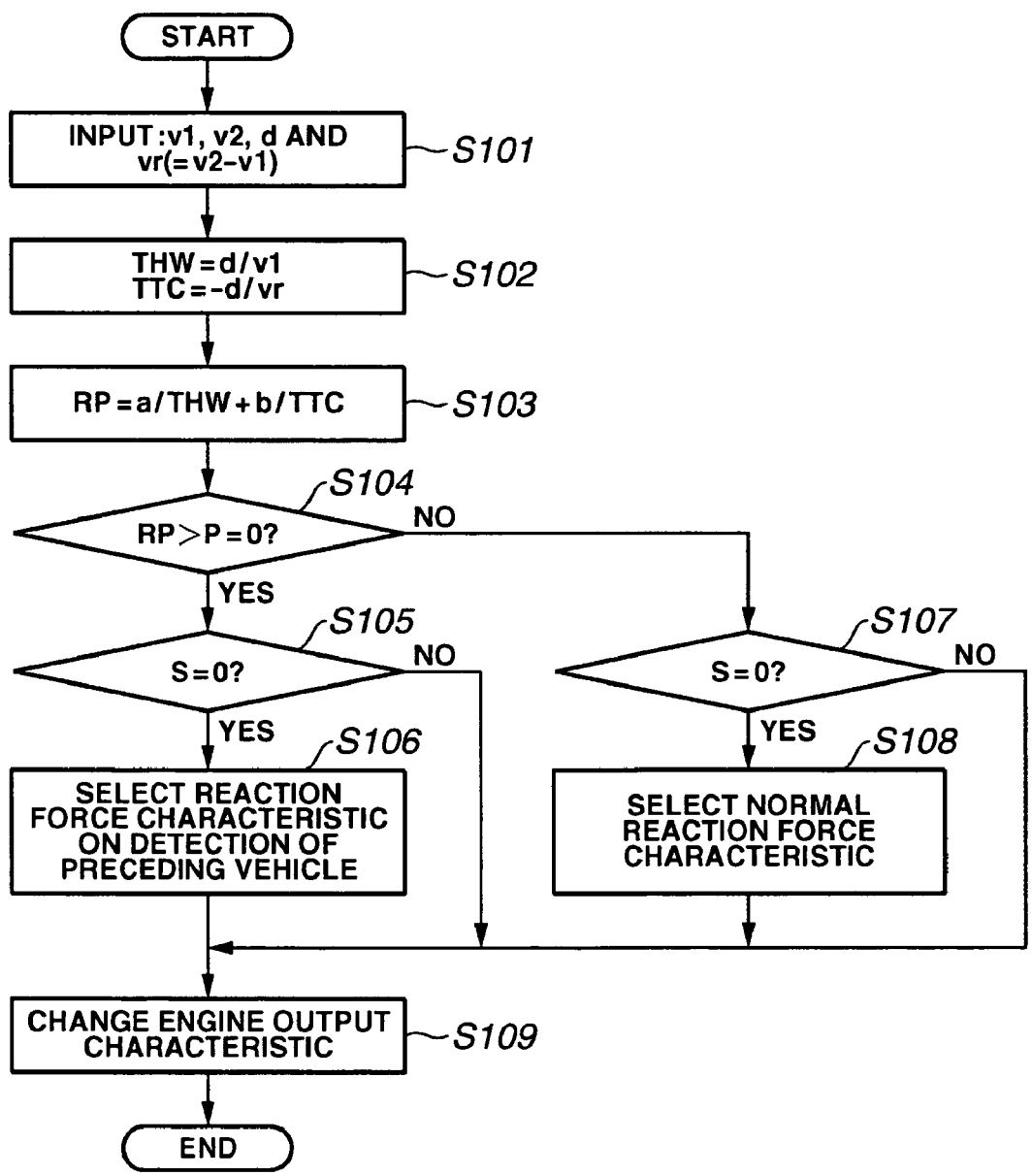
FIG. 4 is a flow chart illustrating operation of the exemplary embodiment.

The method aspect of the present invention may best be understood from the following description on the flow chart of FIG. 4. In the embodiment, the microprocessor repeats execution of a control routine at regular intervals of, for example, 50 milliseconds.

In FIG. 4, at step S101, the microprocessor performs a reading operation of the output of the scene recognition device (radar device 10, vehicle speed sensor 30), and the stroke sensor 70 to receive, as inputs, a vehicle speed v1, a vehicle speed v2 of the preceding vehicle, if available, a distance d to the preceding vehicle, a relative speed vr between the vehicles, and a position S of the accelerator pedal 81.

At step S102, the microprocessor determines a time headway THW and a time to collision TTC between the vehicle and the preceding vehicle by using the equations 1 and 2 described above.

At step S103, the microprocessor determines a risk RP by using the equation 3.

At step S104, the microprocessor determines whether or not the determined risk RP is greater than a predetermined value RP0. If this is the case (RP>RP0), the microprocessor recognizes that the determined risk should be transmitted to the driver and proceeds to determine, at step S105, whether or not the accelerator pedal 81 is released by checking if the position S is zero. If this is not the case (RP≦RP0), the microprocessor proceeds to determine, at step S107, whether or not the accelerator pedal 81 is released by checking if the position S is zero.

Once it has determined, at step S105, that the accelerator pedal 81 is released, the microprocessor proceeds to select, at step S106, the accelerator pedal reaction force characteristic (see the one-dot chain line in FIG. 5) that is appropriate to the environment involving detection of the preceding vehicle. Once this characteristic has been selected at step S106 and a switch to this characteristic has been completed by engaging the electromagnetically operated clutch 61, the microprocessor proceeds from step S105 directly to step S109.

Engaging the electromagnetically operated clutch 61 allows both of the first and second springs 85 and 65 to cooperate with each other to produce increased reaction force F.

Figure 5:
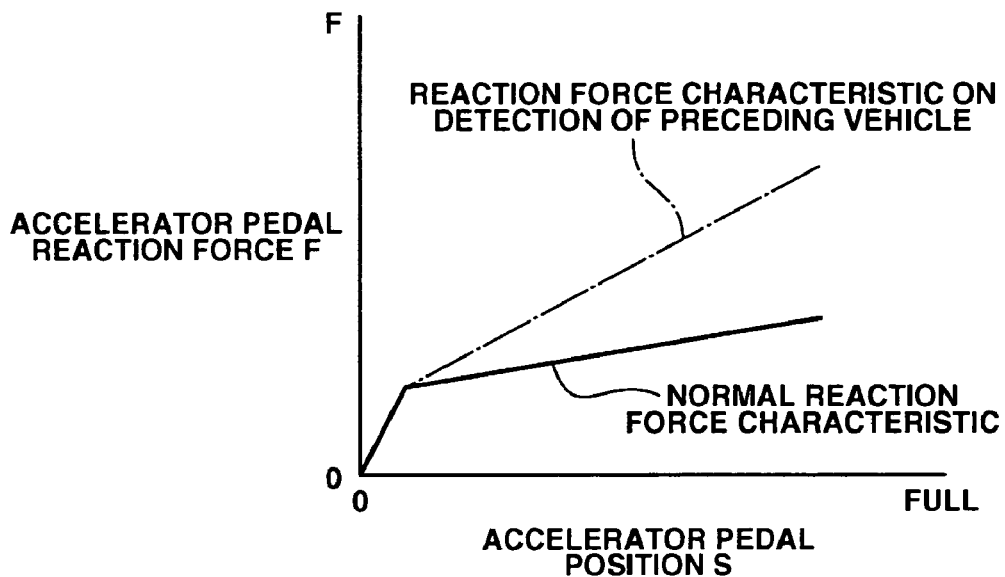
FIG. 5 illustrates one example of different accelerator pedal reaction force characteristics, each providing varying of reaction force with the different positions of the accelerator.

In FIG. 5, as readily seen from the illustrated one-dot chain line in comparison with the solid line, the two different accelerator pedal reaction force characteristics are different from each other in the absolute value of reaction force F over a portion of the whole range of different positions S of the accelerator pedal 81. Over the portion of the whole range of different position S of the accelerator pedal 81, the two different accelerator pedal reaction force characteristics are different from each other in a change in reaction force F per unit change in position of the accelerator.

With continuing reference to FIG. 5, over the portion of the whole range of different positions S of the accelerator pedal, the one-dot chain line drawn characteristic provides increased absolute value in reaction force F at each position S of the accelerator pedal 81. Thus, the driver feels this increased reaction force via the accelerator pedal 81. Over the portion of the whole range of different positions S of the accelerator pedal 81, the one-dot chain line drawn characteristic also provides a higher increase in reaction force F per unit increase in position S of the accelerator pedal 81. Thus, the driver feels greater increase in reaction force F upon depressing the accelerator pedal 81. Via such tactile or haptic inputs, the presence of substantial risk RP is transmitted to the driver.

Once it has determined, at step S107, that the accelerator pedal 81 is released, the microprocessor proceeds to select, at step S108, normal accelerator pedal reaction force characteristic (see the solid line in FIG. 5).

Once this characteristic has been selected at step S108 and a switch to this characteristic has been completed by disengaging the electromagnetically operated clutch 61, the microprocessor proceeds from step S107 directly to step S109.

As mentioned in connection with steps S105 and S107, the switch between the two different characteristics is prohibited when the driver depresses the accelerator pedal 81. Unintentional driver's manipulation of the accelerator pedal 81 due to a change in reaction force is prevented.

Figure 6:
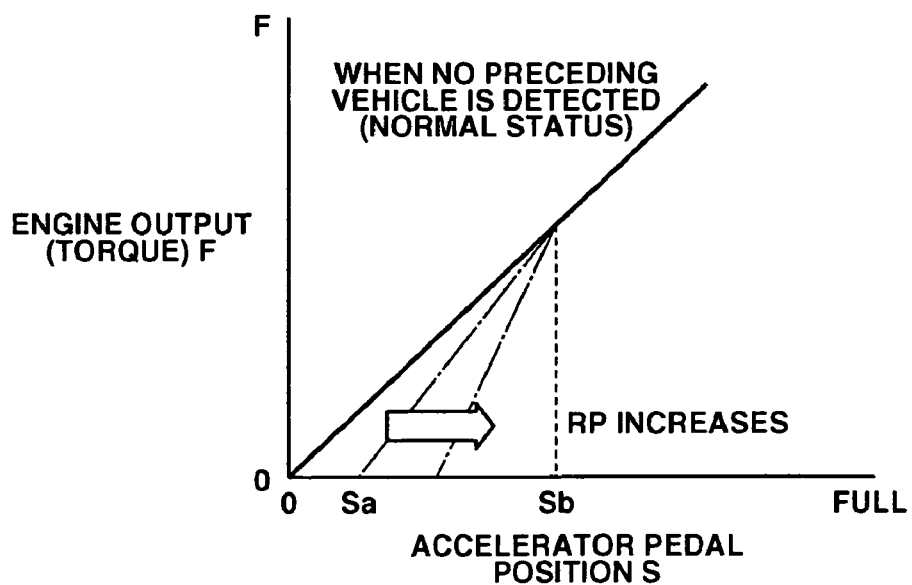
FIG. 6 illustrates one example of an engine output characteristic and its modifications.

At step S109, the microprocessor changes the engine output characteristic in response to the determined risk RP at step S103. In FIG. 6, the solid line indicates the normal engine output characteristic that is selected upon detection of no preceding vehicle. According to this characteristic, the engine output is proportional to the position S of the accelerator pedal 81. After detection of the preceding vehicle, as shown by the one-dot chain lines, a threshold value Sa, at which the engine output begins to appear, shifts in a direction of increasing the position S of the accelerator pedal 81 as the determined risk RP increases. In FIG. 6, the illustrated one-dot chain lines show modified engine output characteristics. Since no engine output is produced until the driver depressed the accelerator pedal 81 down to the threshold value Sa, there is an increasing play of the accelerator pedal 81 as the risk RP increases.

With continuing reference to FIG. 6, a change in engine output per unit increase in position of the accelerator pedal 81 increases as the risk RP increases. As shown in FIG. 6, the engine output characteristic is common at positions of the accelerator pedal 81 exceeding a predetermined value Sb.

If the determined risk RP decreases, the engine output characteristic needs to shift toward the solid normal engine output characteristic. Gradual shift is preferred using, for example, a first-order delay filter. However, it the accelerator pedal 81 is released, a quick return to the solid normal engine output characteristic may be allowed.

The engine controller 91 controls an engine power control element, for example, a throttle valve, to regulate operation of the engine for production of an engine output characteristic of varying of engine output with the different positions S of the accelerator pedal 81.

Figure 7:
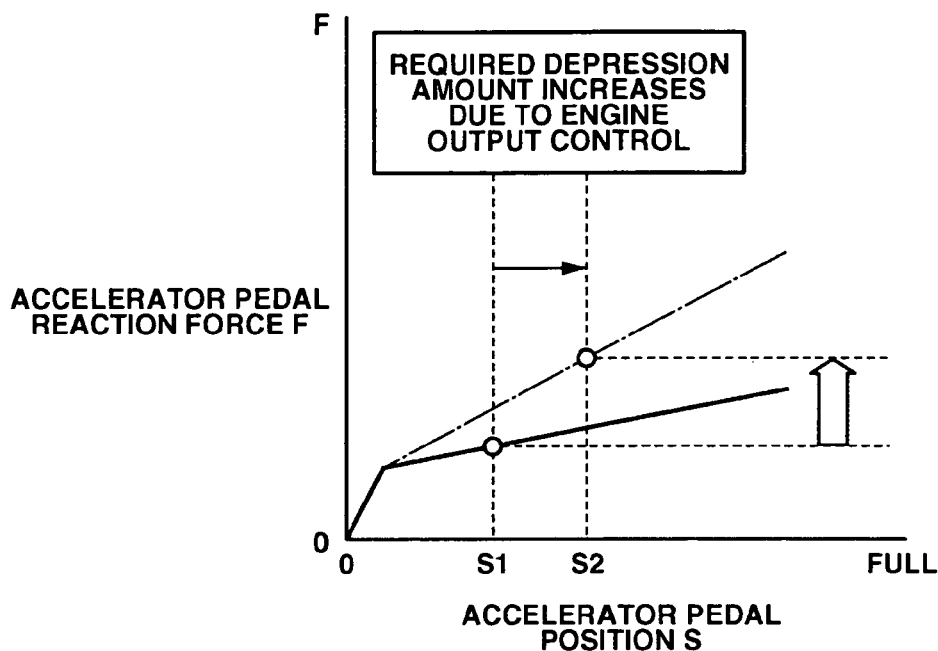
FIG. 7 illustrates operation of the exemplary embodiment.

With reference now to FIGS. 6 and 7, if now the accelerator pedal reaction force as indicated by the one-dot chain line is provided upon or after the risk has exceeded the predetermined value RP0, there is an increase in reaction force F at the position S1 of the accelerator pedal 81. In addition to this increase in reaction force F, a shortage in engine output for this position S1 is felt by the driver because the engine output characteristic has been modified in response to the risk RP to provide less engine output for the same position S of the accelerator pedal 81. The increase in reaction force F in combination with the shortage in engine output makes an effective input to transmit the presence of the risk RP to the driver. The shortage in engine output prompts the driver to depressing the accelerator pedal 81 deeply to a new position S2 to maintain the engine output to the previous level. In addition to an increase in reaction force F to the driver's effort to keep the accelerator pedal 81 at the position S2, an amplified increase in reaction force F per an increase to the new position S2 must be overcome by the driver during a transient period. The increase in reaction force F in combination with the amplified increase in reaction force F during the transient period makes a more effective input to transmit the presence of the risk RP to the driver.

With the same position S maintained, a reduction in engine output causes the driver to feel deceleration, providing an effective input to transmit the presence of the risk RP to the driver.

The embodiment according to the present invention provides the effects as follows:

(1) An increase in reaction force F in combination with a deceleration feel caused due to a shortage in engine output provide an effective input to transmit the presence of risk RP in the environment around the vehicle. It is appreciated that, with a relatively economical construction, the presence of risk RP is effectively transmitted to the driver.

(2) After switching in reaction force characteristic upon or after the risk RP has exceeded the predetermined value RP0, not only an increase in absolute value in reaction force F, but also an amplified increase in reaction force F per unit increase in accelerator pedal position S is provided. One or both of them make an effective input to transmit the presence of risk RP to the driver.

(3) Switching in reaction force characteristic upon or after the risk RP has exceeded the predetermined value RP0 itself makes a clear input to transmit to the driver that reaction force control has started as scheduled.

(4) Switching in reaction force characteristic is prohibited unless the driver has released the accelerator pedal. This is effective in preventing occurrence of unintentional change in engine output upon manipulation of the accelerator pedal, which might be caused due to an increase or decrease in reaction force.

(5) Before the risk RP will exceed the predetermined value RP0, the engine output characteristic is modified in response to the risk RP, producing a deceleration feel to transmit the presence of risk (RP) within the environment around the vehicle.

(6) As shown in FIGS. 3(a) and 3(b), the use of the electromagnetically operated clutch 61 and the tensile spring 65 have eliminated use of an expensive motor and its complicated motor control circuit. Use of such components is appreciated as advantageous.

The reaction force characteristic indicated by the one-dot chain line in FIGS. 5 and 7 is just one of various examples used in the embodiment according to the present invention. Another example is the use of different accelerator pedal reaction force characteristics that are different from each other in the absolute value of reaction force over at least a portion of the whole range of different positions of the accelerator. Another example is the use of different accelerator pedal reaction force characteristics that are different from each other in a change in reaction force per unit change in position of the accelerator pedal over at least a portion of the whole range of the different positions of the accelerator pedal.

Figure 8:
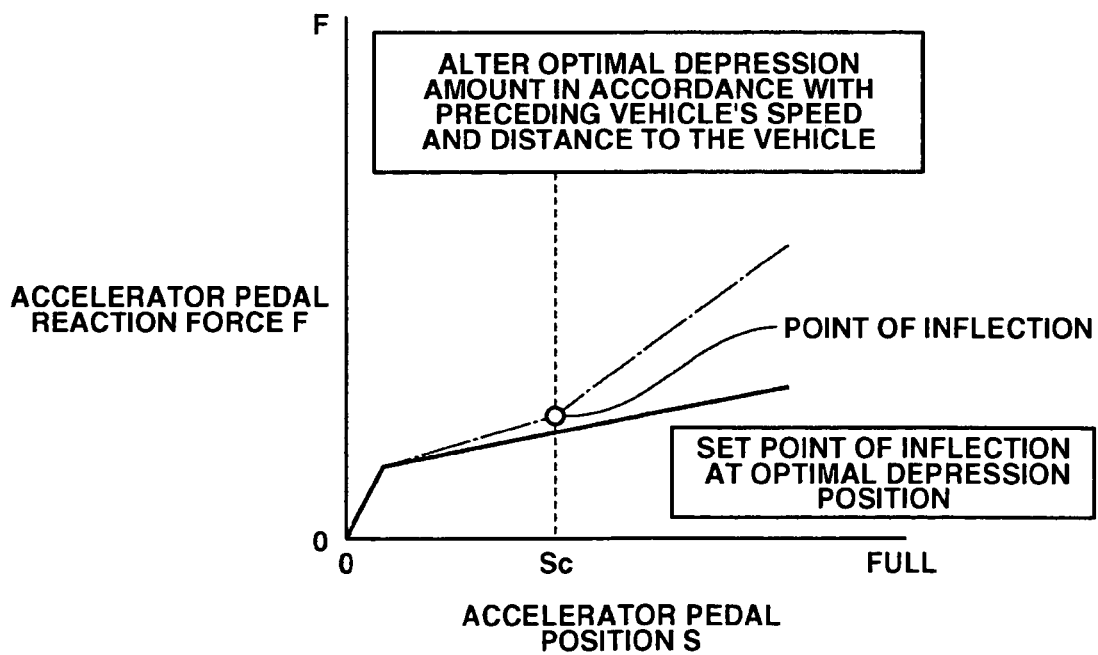
FIG. 8 illustrates another example of different accelerator pedal reaction force characteristics.

FIG. 8 shows another example of the accelerator pedal reaction force characteristics.

In FIG. 8, the one-dot chain line drawn characteristic is selected upon or after the determined risk RP has exceeded the predetermined value RP0. This reaction force characteristic produces a first small increase in reaction force F per unit increase in position of the accelerator pedal 81 over a first portion, below a position Sc, of the whole range of the different positions of the accelerator pedal and a second large increase in reaction force F per unit increase in position S of the accelerator pedal over a second portion, in excess of the position Sc, of the whole range of the different positions S of the accelerator pedal 81. With this characteristic, the accelerator pedal reaction force F slowly increases in the same manner as the fully drawn normal reaction force characteristic until the position S of the accelerator pedal 81 reaches the predetermined value Sc. Once the accelerator pedal 81 is depressed further deeply beyond the predetermined value Sc, the reaction force F increases quickly.

The modified engine output characteristics variable with the risk RP are designed such that, at the predetermined position Sc, the most appropriate engine output is produced to follow the preceding vehicle. With this setting of the modified engine output characteristic, the driver may easily keep the position S of the accelerator pedal at the predetermined position Sc, at which the most appropriate engine output is produced for the vehicle to follow the preceding vehicle.

The one-dot chain line drawn characteristic may be realized by using a non-linear spring as the second tensile spring 65 or by additionally providing a third spring. Such third spring is connected to the pedal 81 via an appropriate slide mechanism. The slide starts sliding when the accelerator pedal 81 is depressed deeply beyond the predetermined value Sc to apply spring force of the third spring to the pedal 81.

According to the illustrated accelerator pedal reaction force characteristic, the driver is allowed to depress the accelerator pedal 81 within a region (S<Sc), but discouraged to depress the accelerator pedal 81 within another region (S≧Sc). By modifying the engine output characteristic to produce the most appropriate engine output for the vehicle to follow the preceding vehicle at the predetermined position Sc, it is possible to realize a vehicle characteristic that allows the driver to follow the preceding vehicle only by keeping the accelerator pedal at the predetermined position Sc as directed by the difference in reaction force.

In order to provide different characteristics of reaction force, two different springs may be connected to the accelerator pedal 81 alternately.

The two rotary shafts 88 and 62 may be interconnected by a pin that may be removed by a solenoid device. In this case, the electromagnetically operated clutch is no longer needed.

In the preceding embodiment, the laser radar 10 and the vehicle speed sensor 30 function as the scene recognition device. The scene recognition device is not limited to this example. Another example is the use of a millimeter wave frequency modulated continuous (FMCW) radar and/or a CCD camera and/or a MOS camera instead of the laser radar 10.

In the preceding embodiment, the controller 50 functions as the control logic determining risk based on the detected state of environment around the vehicle.

In the preceding embodiment, the control logic 60 determines which one out of different accelerator pedal reaction force characteristics as shown, for example, in FIG. 5 or 7 or 8, the accelerator pedal unit 80 should select and produce. It is appreciated that the control logic 60 is responsible for a shift in accelerator pedal reaction force characteristic. It is to be noted that the control logic 60 is not limited to the software implementation. The control logic 60 may be implemented in hardware in the form of a device, namely, an accelerator pedal reaction force shifting device.

In the preceding embodiment, the control logic 90 selects one of data of different engine output characteristics and the engine controller 91 regulates operation of the engine to accomplish the selected engine output characteristic. It is appreciated that the control logic 90 modifies operation of the engine controller 91 to modify the engine output characteristic. It is to be noted that the control logic 90 is not limited to the software implementation. The control logic 90 may be implemented in hardware in the form of a device, namely, an engine output characteristic modifying device.

In the preceding embodiment, the stroke sensor 70 is used to detect amount of driver's manual operation of the accelerator pedal 81. The sensor is not limited to the stroke sensor 70. Another sensor may be used instead of the stroke sensor 70 to detect the amount of driver's manual operation of the accelerator pedal 81.

The present invention is not limited to selection of one of two accelerator pedal reaction characteristics. Three different reaction force characteristics may be made by using more than two springs having different spring characteristics.

In modifying the engine output characteristic, it is possible to modify the characteristic in response to a relative speed between the vehicle and the preceding vehicle and/or a distance to the preceding vehicle. For example, an increase in engine output per an unit accelerator pedal position S is suppressed as the absolute value of the relative speed vr increases and/or the distance becomes short. In this manner, the relationship between the vehicle and the preceding vehicle may be expressed by the relative speed vr and/or the distance d instead of the risk RP.

While the best modes for carrying out the invention have been described in detail, those familiar with the art to which the present invention relates will recognize various alternative designs and embodiments for practicing the invention as defined by the following claims.

What is claimed is:

1. A system for assisting a driver operating a vehicle traveling on a road, the system comprising:
    an engine controller regulating operation of an engine of the vehicle to provide a desired engine output characteristic;
    control logic configured to modify the engine output characteristic in response to at least one of a detected state of an environment around the vehicle and a determined risk; and
    an accelerator having different positions, wherein a reaction force applied to the driver via the accelerator varies with different positions of the accelerator, according to a preset characteristic specifying how the reaction force varies with the positions of the accelerator;
    wherein the control logic includes:
    a first control section that determines the risk based on the detected state of the environment around the vehicle, and
    a second control section configured to modify, according to the determined risk, the preset characteristic specifying how the reaction force applied to the driver via the accelerator varies with different positions of the accelerator; and
    wherein:
    the control logic controls the operation of the engine to switch between a first operation mode and a second operation mode according to the determined risk;
    under the first operation mode, the engine output varies with positions of the accelerator, according to a predefined normal engine output characteristic,;
    under the second operation mode, the engine output varies with positions of the accelerator, according to a modified engine output characteristic selected from multiple predefined modified engine output characteristics according to the determined risk;
    each of the modified engine output characteristics defines a range of accelerator positions, and the engine output corresponding to a position within the range is lower than the engine output corresponding to the same position according to the normal engine output characteristic;
    when the determined risk is lower than a preset threshold, the control logic controls the vehicle to operate under the first operation mode; and
    when the determined risk is higher than the preset threshold, the control logic controls the vehicle to operate under the second operation mode.

2. The system as recited in claim 1, further comprising a scene recognition device detecting the state of the environment around the vehicle.

3. The system as recited in claim 1, wherein the second control section causes the accelerator to select one of different accelerator reaction force characteristics upon determination that an obstacle exists in front of the vehicle with the environment around the vehicle.

4. The system as recited in claim 1, wherein the second control section causes the accelerator to select one of different accelerator reaction force characteristics upon determination that the risk is greater than a predetermined value.

5. The system as recited in claim 1, wherein the second control section causes the accelerator to select one of different accelerator pedal reaction force characteristics upon determination that the accelerator pedal has been released.

6. The system as recited in claim 1, wherein, regardless of operation of the second control section, the control logic modifies the engine output characteristic in response to at least one of the detected state of environment and the determined risk.

7. A method of assisting a driver operating a vehicle by manipulating an accelerator having different positions, wherein an engine output of the vehicle changes with different positions of the accelerator, and a reaction force applied to the driver via the accelerator varies with different positions of the accelerator according to a preset characteristic specifying how the reaction force varies with different positions of the accelerator the method comprising:
    detecting a state of an environment around the vehicle;
    determining risk based on the detected state of environment around the vehicle;
    modifying the engine output corresponding to the respective position of the accelerator according to at least one of the detected state of environment and the determined risk;
    modifying, according to the determined risk, the preset characteristic specifying how the reaction force applied to the driver via the accelerator varies with different positions of the accelerator; and
    switching the operation of the engine to switch between a first operation mode and a second operation mode according to the determined risk;
    wherein:
    under the first operation mode, the engine output varies with positions of the accelerator, according to a predefined normal engine output characteristic,;
    under the second operation mode, the engine output varies with positions of the accelerator, according to a modified engine output characteristic selected from multiple predefined modified engine output characteristics according to the determined risk;
    each of the modified engine output characteristics defines a range of accelerator positions, and the engine output corresponding to a position within the range is lower than the engine output corresponding to the same position according to the normal engine output characteristic;
    when the determined risk is lower than a preset threshold, the engine operates under the first operation mode; and
    when the determined risk is higher than the preset threshold, the engine operates under the second operation mode.

8. A vehicle comprising:
    an engine controller configured to regulate an operation of an engine of the vehicle to provide a desired engine output characteristic;

control logic configured to modify the engine output characteristic according to at least one of a detected state of an environment around the vehicle and a determined risk; and an accelerator having different positions, wherein a reaction force applied to the driver via the accelerator varies with different positions of the accelerator, according to a preset characteristic specifying how the reaction force varies with the positions of the accelerator; and an engine output characteristic of the vehicle changes with different positions of the accelerator;

wherein the control logic includes a first control section that determines the risk based on the detected state of the environment around the vehicle, and a second control section configured to modify, according to the determined risk, the preset characteristic specifying how the reaction force applied to the driver via the accelerator varies with different positions of the accelerator; and wherein:

the control logic controls the operation of the engine to switch between a first operation mode and a second operation mode according to the determined risk;

under the first operation mode, the engine output varies with positions of the accelerator, according to a predefined normal engine output characteristic,;

under the second operation mode, the engine output varies with positions of the accelerator, according to a modified engine output characteristic selected from multiple predefined modified engine output characteristics according to the determined risk; and each of the modified engine output characteristics defines a range of accelerator positions, and the engine output corresponding to a position within the range is lower than the engine output corresponding to the same position according to the normal engine output characteristic;

when the determined risk is lower than a preset threshold, the control logic controls the vehicle to operate under the first operation mode; and when the determined risk is higher than the preset threshold, the control logic controls the vehicle to operate under the second operation mode.

9. A system for assisting a driver operating a vehicle having an engine, the system comprising:

an accelerator pedal operable by the driver;

a stroke sensor configured to determine a position of the accelerator pedal;

an accelerator pedal unit including a first spring for applying a reaction force to the driver via the accelerator pedal, a second spring in parallel to the first spring, and an electromagnetically operated clutch for cooperating the second spring with the first spring to provide an increased reaction force to the driver via the accelerator pedal when the electromagnetically operated clutch is engaged;

an engine controller configured to regulate an engine output characteristic in response to the determined position of the accelerator pedal;

a scene recognition device configured to detect a state of environment around the vehicle; and control logic configured to determine a risk in response to the detected state of environment around the vehicle, compare the determined risk with a predetermined risk value, and determine whether the accelerator pedal is released;

the control logic being operative to shift the electromagnetically operated clutch to a disengaged state, when the accelerator pedal is released, under a condition when the determined risk is not greater than the predetermined risk value; and to an engaged state, when the accelerator pedal is released, under a condition when the determined risk is greater than the predetermined risk value; and the control logic being operative to cause the engine controller to modify the engine output characteristic relative to different positions of the accelerator pedal, in response to the determined risk.

10. The system as claimed in claim 9, wherein the control logic shifts the electromagnetically operated clutch to the engaged state to give the increased reaction force to the driver via the accelerator pedal when the determined risk is greater than the predetermined value to transmit the condition that the determined risk is greater than the predetermined value to the driver via the increased reaction force from the accelerator pedal.

11. The systems as claimed in claim 10, wherein the control logic cause the engine controller to modify the engine output characteristic to transmit the determined risk via the modified engine output characteristic.

12. A method of assisting a driver operating a vehicle having an engine and an accelerator pedal, the method comprising:

determining the position of the accelerator pedal;

providing an accelerator pedal unit including a first spring for giving reaction force to the driver via the accelerator pedal, a second spring in parallel to the first spring, and an electromagnetically operated clutch;

providing an engine controller regulating operation of the engine to provide an output characteristic in response to the determine position of the accelerator pedal;

detecting a state of environment around the vehicle;

determining a risk in response to the detected state of environment around the vehicle, compares the determined risk with a predetermined risk value, and determines whether the accelerator pedal is released;

engaging the electromagnetically operated clutch to cooperate the second spring with the first spring when the determined risk is greater than a predetermined risk value to transmit a condition that the determined risk is greater the predetermined value to the driver via the increased reaction forced from the accelerator pedal; and causing the engine controller to modify the engine output characteristic relative to different positions of the accelerator pedal to transmit the determined risk via the modified engine output characteristic.

* * * * *